United States Patent [19]
Brockelsby et al.

[11] Patent Number: 5,192,954
[45] Date of Patent: Mar. 9, 1993

[54] ROADWAY ANTENNAE

[75] Inventors: William K. Brockelsby; Conrad M. B. Walker; Michael H. Hryciuk; Donald P. Gillis, all of Edmonton, Canada

[73] Assignee: Mark IV Transportation Products Corporation, Niles, Ill.

[21] Appl. No.: 666,257

[22] Filed: Mar. 8, 1991

Related U.S. Application Data

[63] Continuation-in-part of Ser. No. 446,234, Dec. 5, 1989, which is a continuation-in-part of Ser. No. 383,169, Jul. 20, 1989, Pat. No. 4,937,581, which is a continuation of Ser. No. 195,400, May 13, 1988, Pat. No. 4,870,419, which is a continuation of Ser. No. 661,712, Oct. 17, 1984, abandoned, which is a continuation-in-part of Ser. No. 536,010, Sep. 26, 1983, abandoned, which is a continuation-in-part of Ser. No. 234,570, Feb. 13, 1981, abandoned.

[51] Int. Cl.$^5$ .............................................. G01S 13/74
[52] U.S. Cl. ...................................... 342/42; 343/719; 342/368
[58] Field of Search ................... 343/719; 342/22, 42, 342/44, 69, 368, 457; 340/23

[56] References Cited

U.S. PATENT DOCUMENTS

| | | | |
|---|---|---|---|
| 2,597,517 | 5/1952 | Noble | 342/22 |
| 3,594,798 | 7/1971 | Leydorf et al. | |
| 3,803,616 | 4/1974 | Kopf et al. | |
| 3,906,492 | 9/1975 | Narbaits-Jaureguy et al. | 342/22 |
| 4,303,904 | 12/1981 | Clasek | 340/23 |
| 4,687,445 | 8/1987 | Williams | |
| 4,829,310 | 5/1989 | Losee | |
| 4,860,020 | 8/1989 | Wong et al. | |
| 4,873,529 | 10/1989 | Gibson | |
| 4,908,615 | 3/1990 | Bayraktaroglu | 340/917 |
| 4,912,471 | 3/1990 | Tyburski et al. | |
| 4,914,445 | 4/1990 | Shoemaker | |
| 4,983,984 | 1/1991 | Shibano et al. | 342/457 X |
| 5,041,837 | 8/1991 | Shibano | 342/457 |

OTHER PUBLICATIONS

Antenna Handbook, by Y. T. Lo & S. W. Lee Van Nostrand-Reinhold Co., N.Y.—1988; pp. 968, 969.
Microstrip Antenna Theory And Design—pp. 116-129, James, Hall Wood: Peter Perigrinus LTD, United Kingdom 1981.
Reference Data For Radio Engineers, pp. 27-14, 27-15 Howard W. Sams & Co., N.Y.—1981.
Antenna Engineering Handbook, pp. 8-1 thru 8-14 Henry Jasic, Ed. McGraw-Hill, N.Y., 1961.
Antenna Handbook, Y. T. Lo & S. W. Lee, pp. 12-3 thru 12-9.
Radio Communication Hand Book 5th Edition—1986 pp. 12.59-12.61; Published By Radio Society of Great Britain.

Primary Examiner—Mark Hellner
Attorney, Agent, or Firm—Francis J. Lidd

[57] ABSTRACT

Antennas designed for use in producing effective electromagnetic capture zones for transponders mounted on moving vehicles. The antenna systems disclosed are principally designed to be mounted at or near the surface of a roadway carrying the vehicle whose transponder is to be interrogated. A principal advantage of the antennas of the invention is minimal interference with normal operation of the road and greatly reduced cost of installation when used in providing vehicle identification, toll collection, or communication with the transponder carrying vehicle.

17 Claims, 11 Drawing Sheets

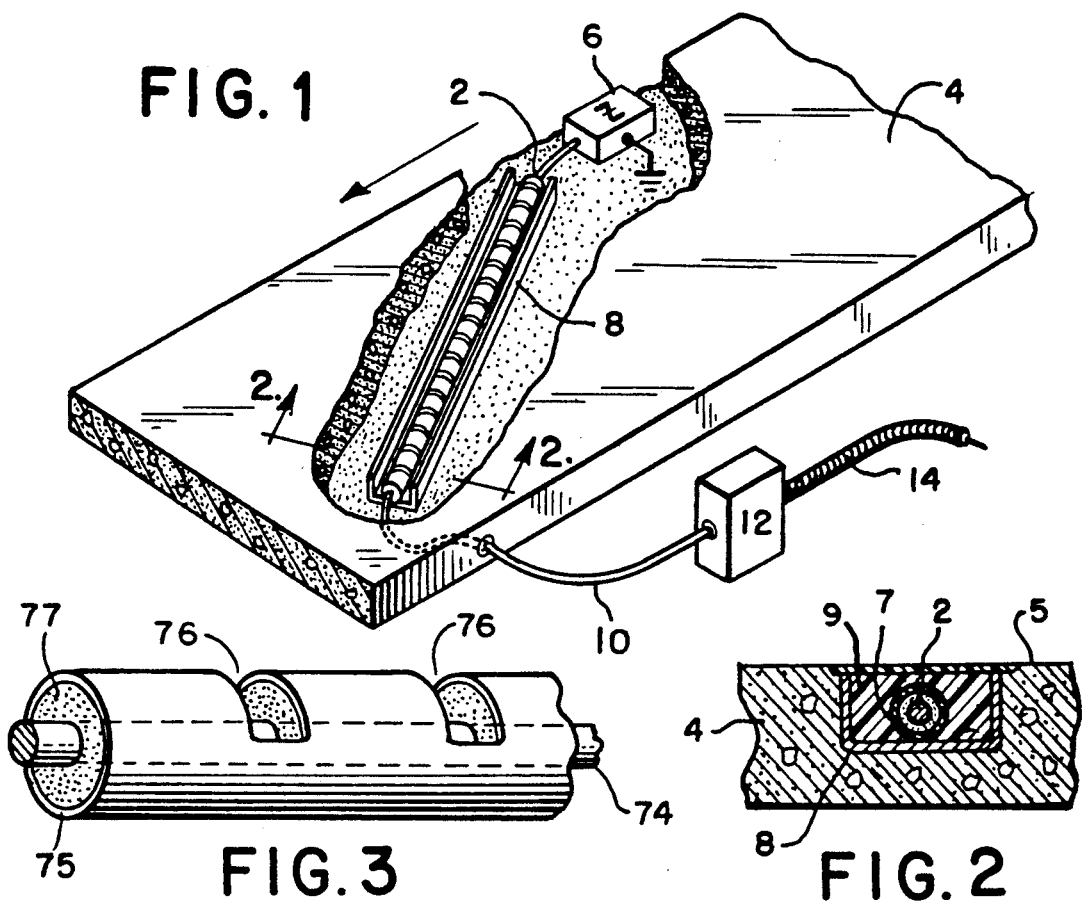
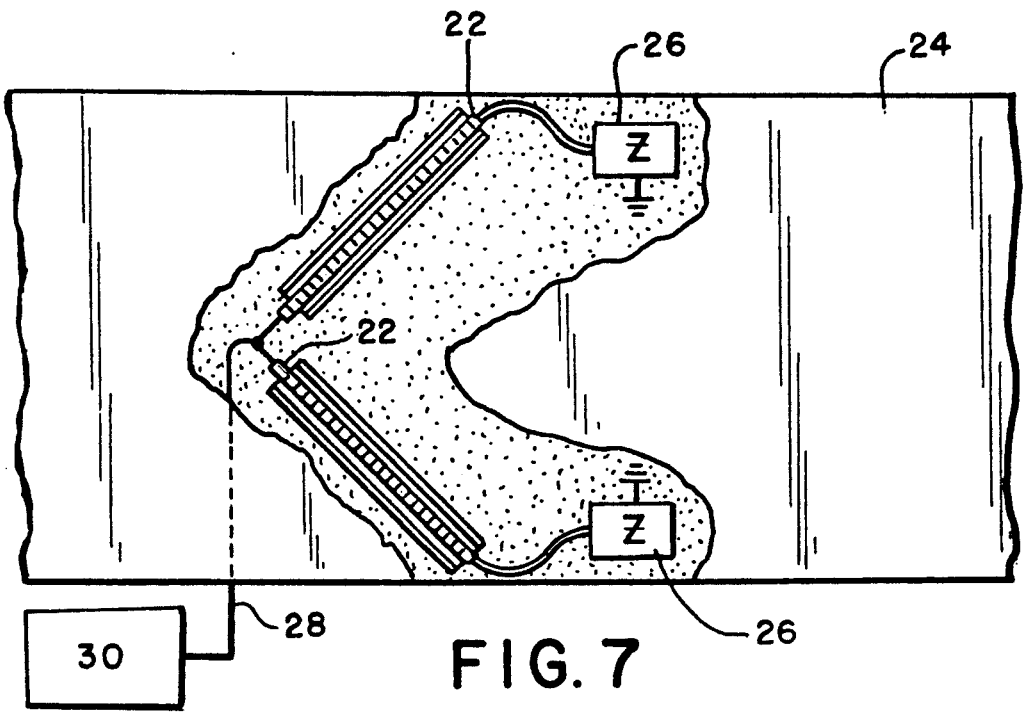

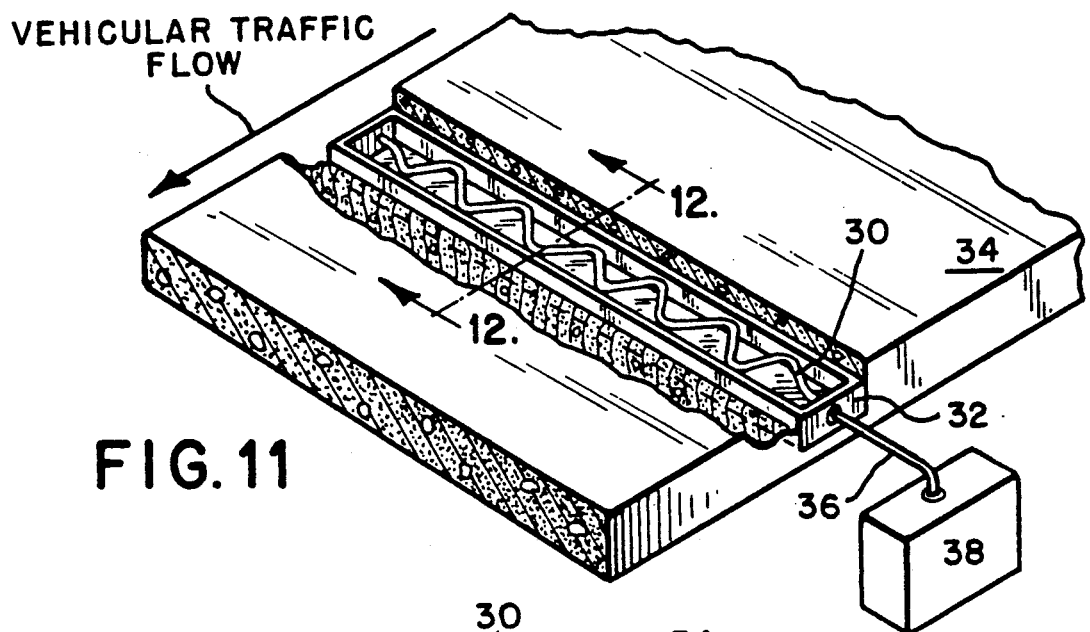
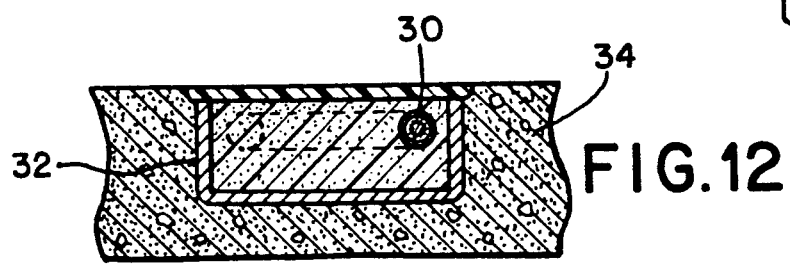
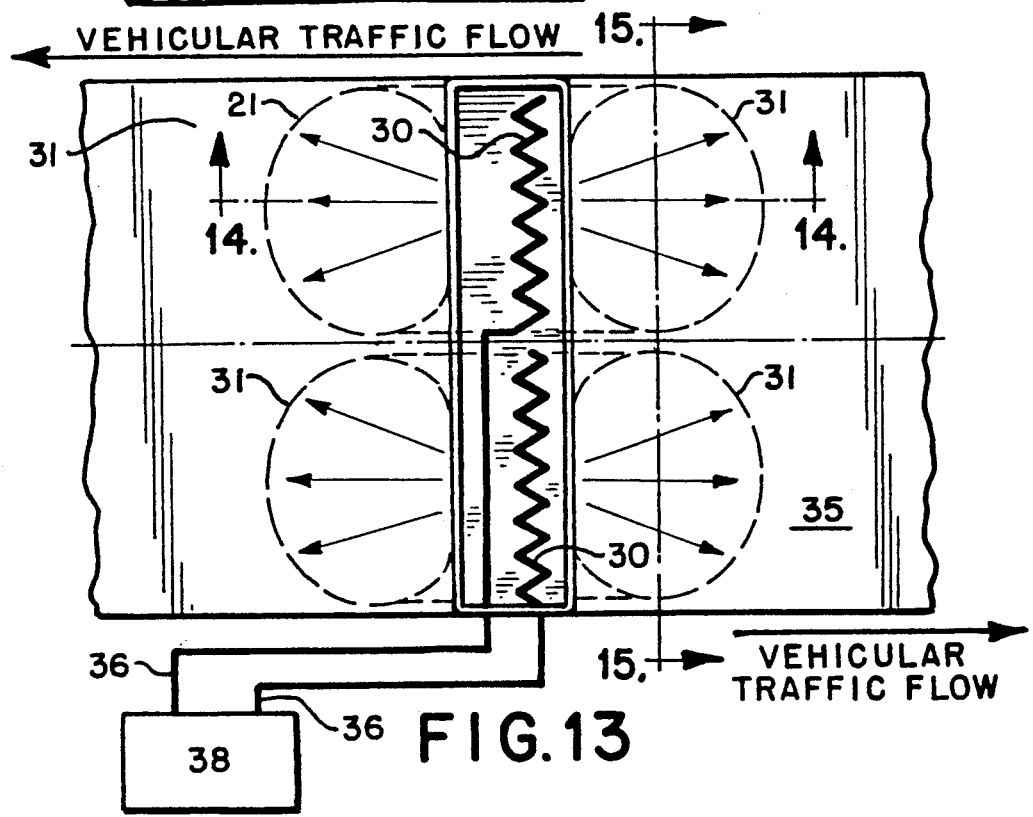

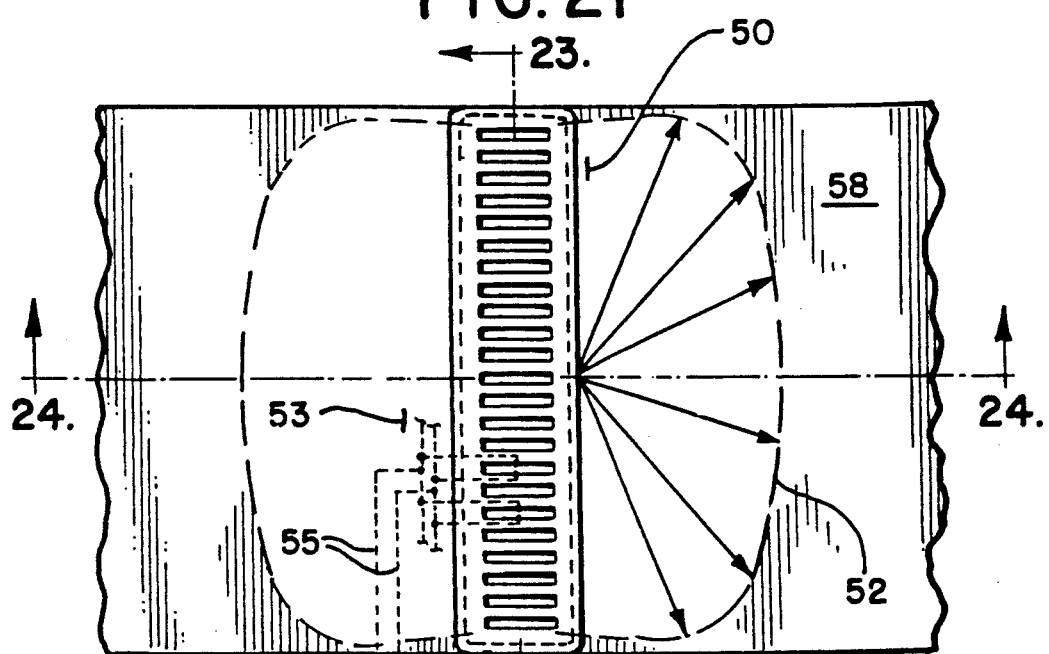
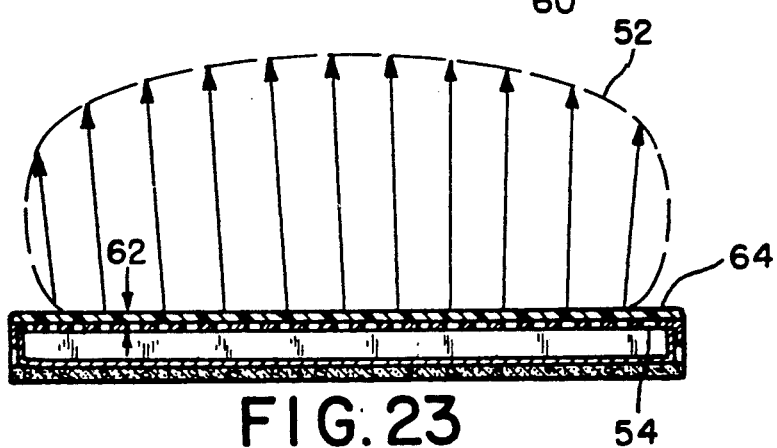
FIG. 21
FIG. 22
FIG. 23

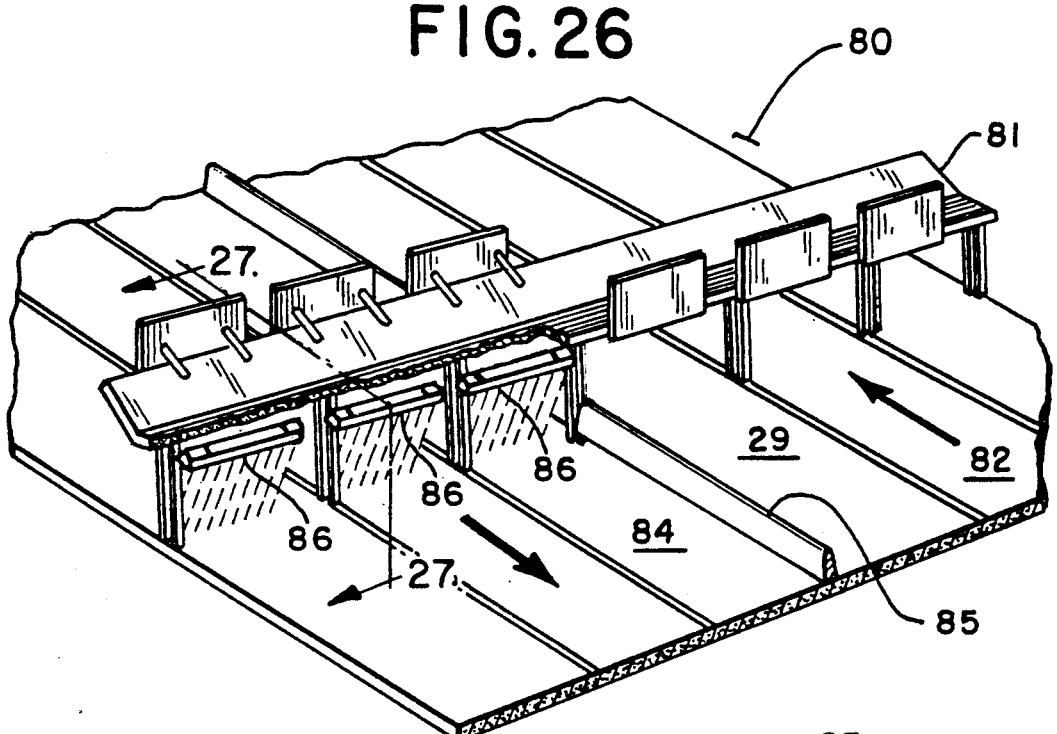
FIG. 26
FIG. 27
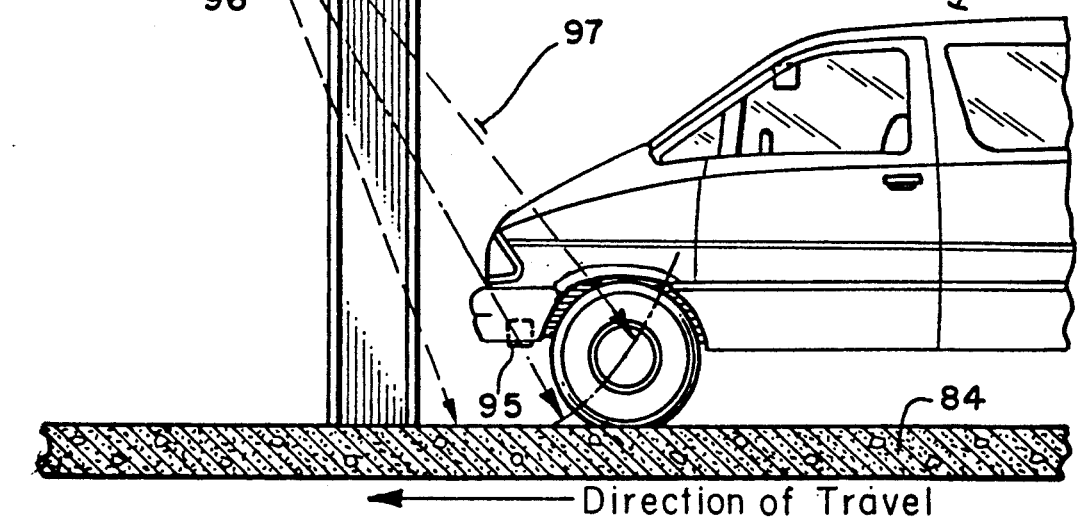
Direction of Travel

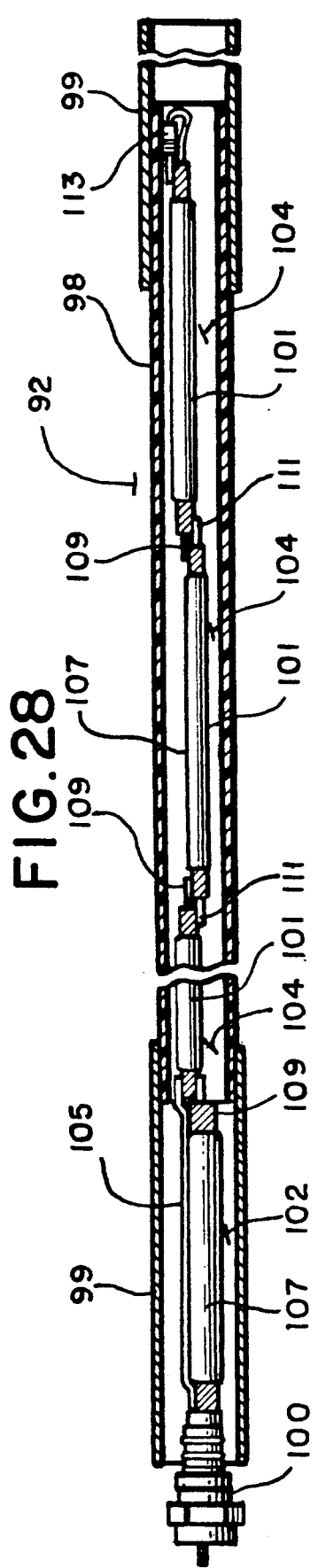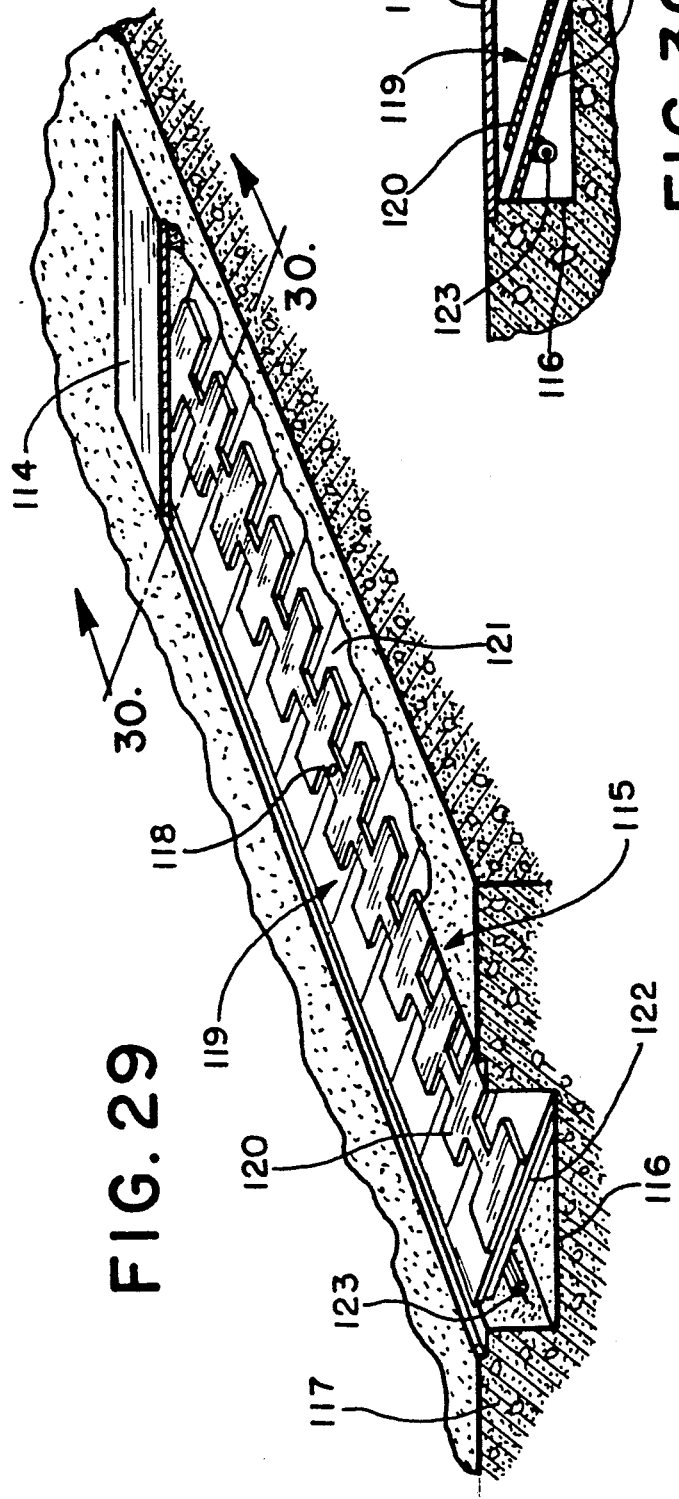

ROADWAY ANTENNAE

CROSS REFERENCE TO RELATED APPLICATIONS

This is a continuation-in-part of co-pending application Ser. No. 446,234 filed Dec. 5, 1989 to Brockelsby, et al., (by request for change of inventor) for Highway Vehicle Identification System with High Gain Antenna and assigned to the present assignee; which is a continuation-in-part of co-pending application Ser. No. 0.383,169, filed Jul. 20, 1989, to Baldwin, et al., U.S. Pat. No. 4,937,581 for Electronic Identification System, and assigned to the present assignee; which is a continuation of Ser. No. 0.195,400, filed May 13, 1988, U.S. Pat. No. 4,870,411 to Baldwin, et al., for Electronic Identification System, and assigned to the present assignee and now U.S. Pat. No. 4,870,419, issued Sep. 26, 1989; which is a continuation of application Ser. No. 661,712, filed Oct. 17, 1984, abandoned to Baldwin et al., for Electronic Vehicle Identification System, assigned to the present assignee and now abandoned; which is continuation-in-part of application Ser. No. 536,010, abandoned filed Sep. 26, 1983, to Baldwin, et al., for Electronic Identification System, assigned to the present assignee and now abandoned; which is a continuation-in-part of application Ser. No. 234,570, filed Feb. 13, 1981, to Baldwin, et al. abandoned, for Electronic Identification System, assigned to the present assignee and now abandoned.

BACKGROUND OF THE INVENTION

This invention relates generally to antennas for electromagnetic communication between stationery locations along a roadway and vehicles traveling along the roadway equipped with transponders carrying information relating to the vehicle. In particular, this invention pertains to specific types of improvements in road mounted electromagnetic antennas configured to provide a predetermined signal field above the roadway surface providing reliable and accurate communication between the road antenna and the vehicular mounted transponder.

In our co-pending applications Ser. No. 446,231, filed on Dec. 5, 1989, a specific type of road antenna utilizing a collinear array was disclosed for use in establishing the proper radiation pattern providing a transponder capture zone above a roadway for communicating with a vehicular transponder. While the collinear design operates satisfactorily, applicants have discovered that a certain number of additional antenna designs can be utilized at or near the road surface in order to provide the necessary electromagnetic signal strength along the roadway thereby improving the transfer of information between the roadside station and moving vehicles. These improved antennas provide proper transponder capture zones which satisfy many installation difficulties.

In addition, certain of the antenna configurations disclosed in application Ser. No. 446231 disclosed may not be adequate in capturing the transponders of narrow vehicles such as motorcycles or motorbikes since these vehicles can operate near the edges of the lane or roadway and could deliberately or inadvertently avoid the signal produced by a conventional roadway antenna. The improved antennas disclosed herein include both the resonant standing wave, and non-resonant, i.e., travelling wave antennas including designs linear microstrip arrays, along with a slot antenna design.

It is therefore an object of this invention to provide a plurality of road mounted antennae having improved signal intensity patterns.

It is further an object of this invention to provide road mounted antennae suitable for capturing transponders carried by vehicles occupying reduced portions of a standard highway lane.

It is yet an additional object of this invention to improve antennas for road mounting which include reduced and/or simplified installation in the road surface.

SUMMARY OF THE INVENTION

Applicants have discovered that although the system disclosed in the above mentioned co-pending application has operated properly and fulfills its disclosed objectives, further investigation and development work in applying automatic vehicle identification (AVI) systems has revealed that a variety of AVI applications, particularly the fastoll operations where roadway antennas are part of toll road collection booths, require antenna designs providing transponder capture zones not contemplated by applicants earlier invention. Additionally, economic factors dictate use of variations in antenna designs for use in the wide variety of applications encountered.

More specifically, it is necessary to generate transponder capture zones which are specific to certain vehicles having transponder locations on the vehicle at various random locations. Further, certain spatial limitations in installing antennas may require generating a capture zone adjacent to the antenna mechanical configuration.

Economic consideration in many situations dictate the need to reduce material construction costs. Therefore, alternate embodiments of applicants novel road surface antenna are required, and as disclosed herein, include antenna types and shapes suitable for mounting in a vehicular roadway and generating an electromagnetic field or transponder capture zone of shape and intensity insuring capture and communication with a transponder mounted on vehicles traversing said roadway. In particular the antennas disclosed include:

Long wire (multiple wavelength) traveling wave antennas having radiating elements disposed along and oblique to the direction of vehicular travel incorporating a multiplicity of elements the direction of roadway travel including, as a particular case, a V-shaped element configuration having two elements skewed to the direction of travel.

Long wire standing wave antennas including a multiplicity of phased dipoles oriented generally parallel to the direction of roadway travel in an array disposed essentially perpendicular to said roadway travel.

Stripline antennas including but not limited to meandering, sawtooth, chain and "Patch" antenna designs such as described in "Microstrip Antenna Theory And Design," by I. R. James, P. S. Hall, C. Wood published by Peregrinus LTD., Londen, United Kingdom, United Kingdom, 1971.

A serpentine, saw-tooth or meandering antenna configuration of the stripline type wherein the element crests are operated in-phase through relationships between series connected radiating elements.

A "slot" antenna consisting of a conductive sheet mounted on the roadway surface having slotted resonant at the system operating frequency, appropriately spaced and phased to produce an electromagnetic field concentrated in a direction of perpendicular to the roadway.

Highly detailed designs of the specific antenna types will in most cases not be presented here, since the invention disclosed herein is concerned with novel applications of antenna designs well known in the antenna arts, to roadway communication with moving transponders carried by vehicles. Specific references to known designs are provided, thereby providing adequate description of the antennas disclosed to enable those skilled in the antenna arts to practice the invention.

BRIEF DESCRIPTION OF THE DRAWINGS

Objects and advantages of the invention disclosed will become apparent upon reading the following detailed description and upon reference to the drawings in which:

FIG. 1 is a pictorial semi-diagrammatical representation of a single element longwire traveling wave antenna shown as typically mounted in a roadway surface.

FIG. 2 is a partial section along the line 2—2 of figure one particularly showing the location of the antenna's radiating element in a structure showing the relationship between the antenna and the road material.

FIG. 3 is a partial section and pictorial representation of the leaky coax element of one embodiment of the antenna array as used in various antenna designs of the invention disclosed herein.

FIG. 7 is a plan view, with partial road surface removed, showing the placement of a two element traveling wave antenna shown mounted in the roadway.

FIG. 11 is a partial perspective with partial road tearaway, of a standing wave antenna of linear microstrip design having a "meandering" configuration disposed perpendicular to the path of traffic along a single lane roadway.

FIG. 12 is a partial cross sectional along the line 12—12 of FIG. 11 particularly showing the placement of the antenna of FIG. 11 in relationship to the road material and road surface.

FIG. 13 is a diagrammatical plan view representation of the horizontal plane radiation of the meandering antenna of FIG. 11 particularly shown in a two lane bi-directional roadway.

FIG. 21 is a pictorial representation showing the placement of a "slot" antenna disposed perpendicular to a single lane roadway.

FIG. 22 is a partial and pictorial cross section showing the construction of and a depiction of "typical" terminations of a portion of the slot antenna of FIG. 21.

FIG. 23 is a cross section along the line 23—23 of FIG. 21, particularly showing the transverse above the road radiation pattern of the slot antenna of FIG. 21 across a single lane one directional roadway.

FIG. 26 is a partial perspective of an overhead version of certain of the antennas of the invention particularly showing locations along a multi lane bi-directional roadway.

FIG. 27 is a cross section along the lines 27—27 of FIG. 26 particularly showing the relationship of the overhead antenna of FIG. 26 and its relationship to a vehicle approaching the antenna.

FIG. 28 is a cross-sectional view of the overhead antenna array along line 28—28 of FIG. 27.

FIG. 29 is a semi pictorial cross section of an additional embodiment of the invention particularly showing use of a linear micro strip line patch antenna embedded in the roadway.

FIG. 30 is a section along the lines 30—30 of FIG. 29 showing one form of positioning of the patch antenna of FIG. 29 when mounted in the roadway.

DETAILED DESCRIPTION OF THE INVENTION

Figure 4:
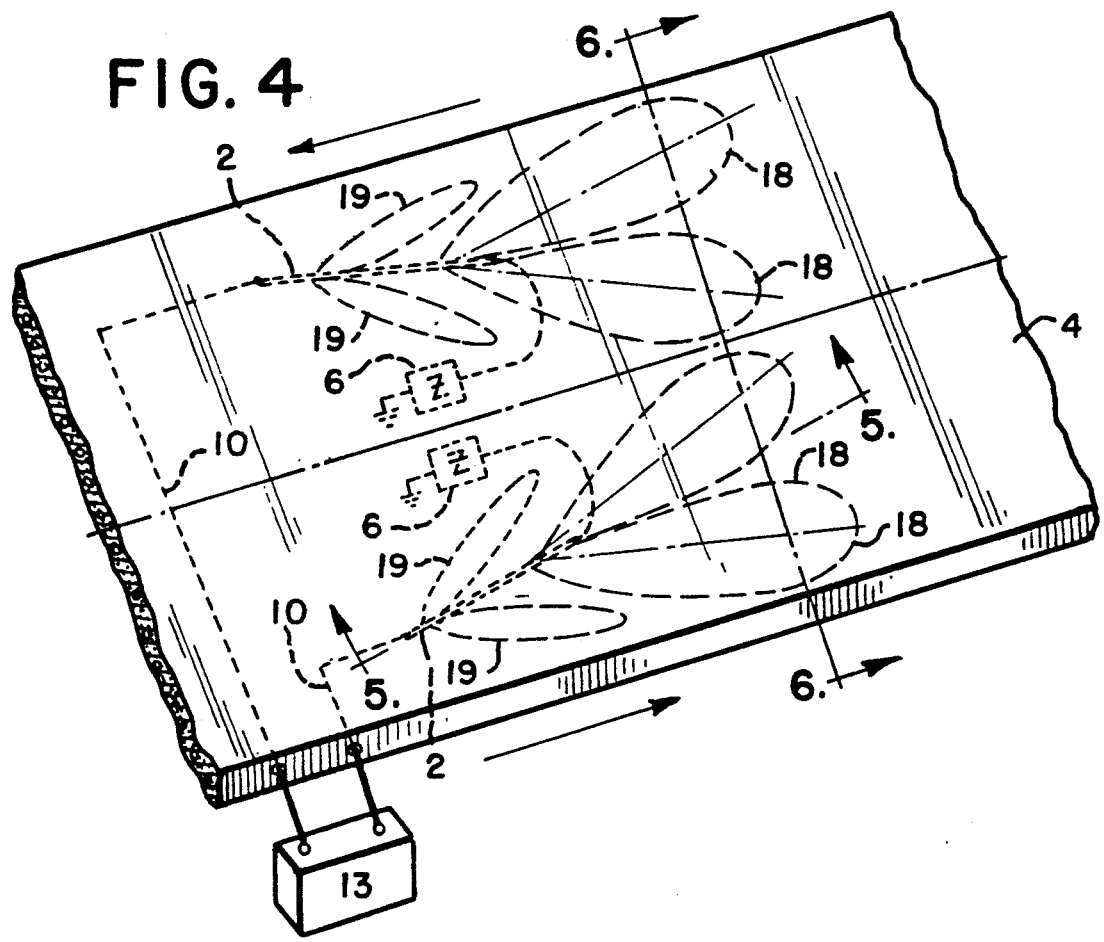
FIG. 4 is a partial perspective representation of two antennas of FIG. 1 with associated radiation patterns, particularly as mounted as in a two lane bidirectional road.

With particular reference to FIGS. 1 through 6, a multiple wave length or long wire antenna 2 is obliquely disposed in a roadway 4 having a surface 5. The antenna 2 has a feed line 10 coupled to a transmission line 14 by coupling means 12. Long wire antenna designs are well know to those skilled in the antenna arts. Typically a description of the detailed design in contained in the "Radio Communication Handbook" published by the Radio Society of Great Britain (1986) at PP 12.59 thru 12.61.

Figure 25:
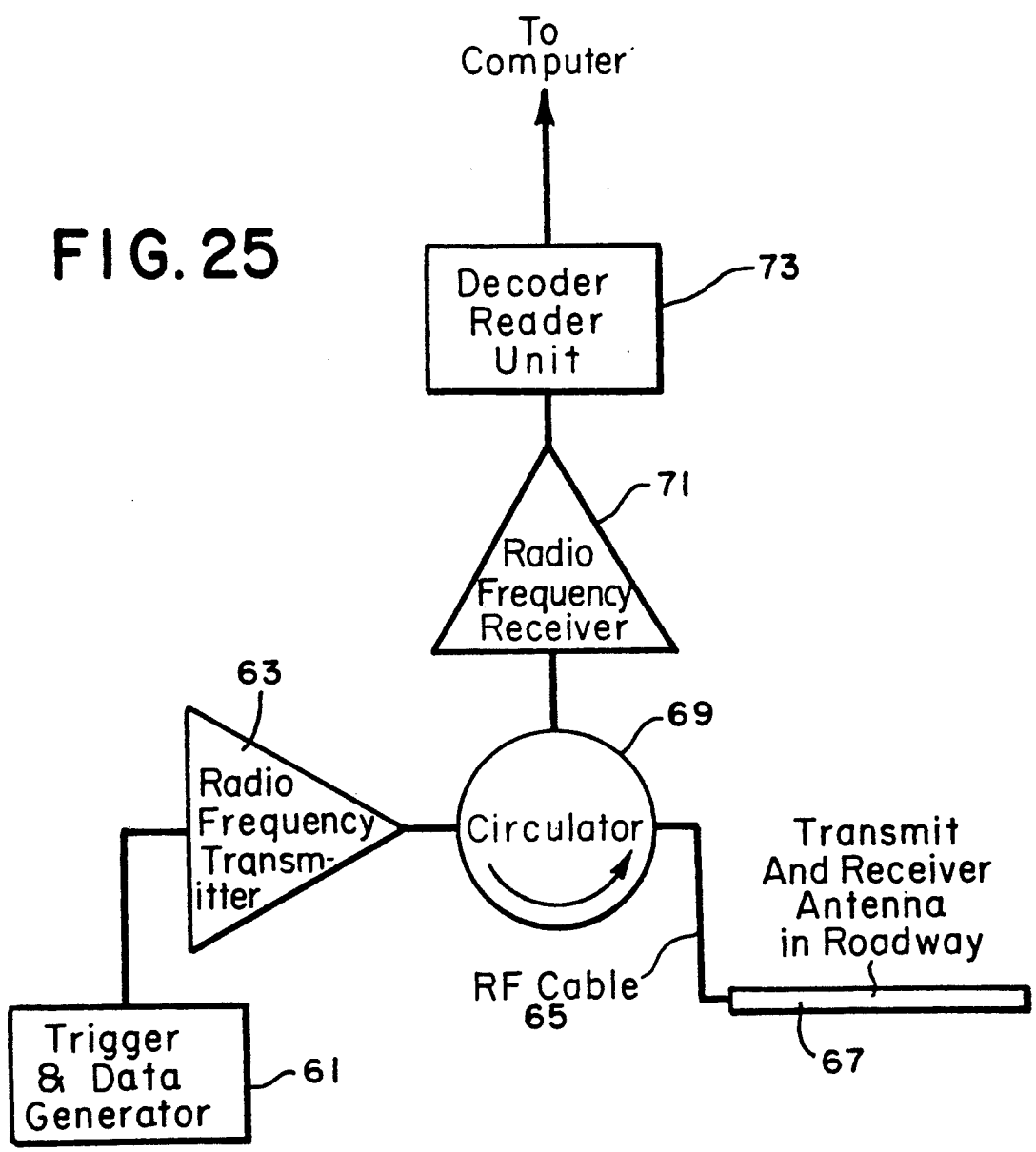
FIG. 25 is a system block diagram in functional form, of the components utilized in a typical roadside installation, particularly showing the signal flows between the antenna of the invention and associated equipment.

The transmission line 14 typically will be driven by an interrogator or reader having functional elements shown in FIG. 25. Other means of exciting road antennae of the invention disclosed herein, will be well known to those skilled in the art, or as shown in U.S. Pat. No. 4,870,419 hereby incorporated by reference.

At its terminal end, the antenna 2 incorporates a terminal impedance 6. As mounted in the roadway and shown in FIG. 2, the antenna conductor 2 is contained in a channel 8 having a cover, both non-conductive, and surroundedsurrounded by suitable protective material 9 and an optional non conductive outer shell 7.

Although shown in a single lane unidirectional road segment 4, a more typical application is shown in FIG. 4, wherein two elements of antenna 2 are shown arranged in a two lane bi-directional configuration wherein major antenna radiation patterns 18, assist in establishing transponder capture zones are shown.

Figure 5:
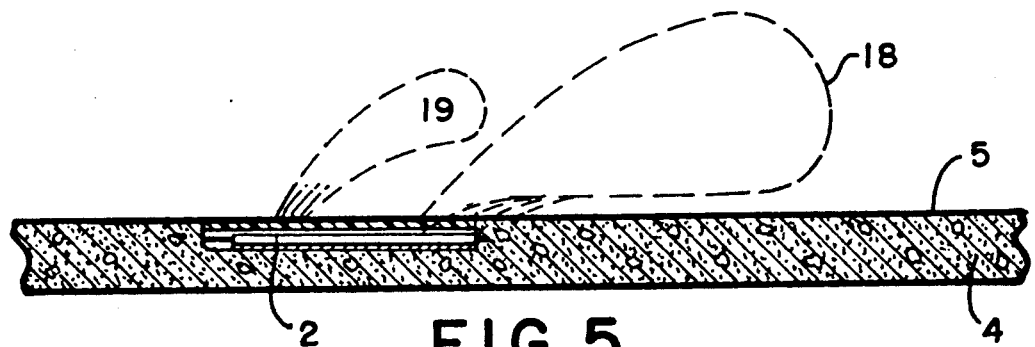
FIG. 5 is a partial cross section along the lines 5—5 of FIG. 4 particularly showing the above the road radiation patterns associated with the antenna array of FIG. 4.
Figure 6:
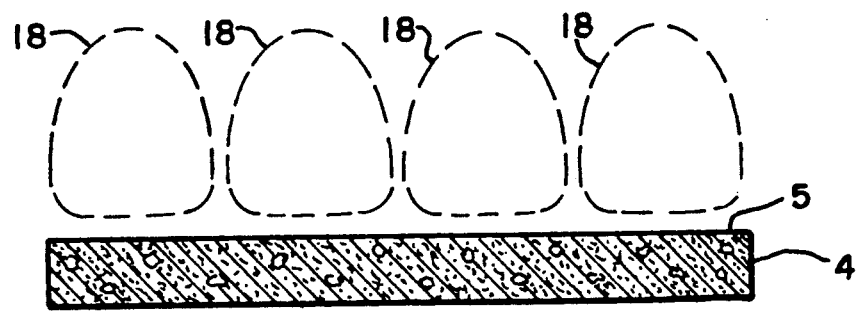
FIG. 6 is an additional section along the lines 6—6 of FIG. 4 particularly showing the above the road radiation patterns perpendicular to the road axes, of the antenna of FIG. 4.

FIGS. 5 & 6 are further depictions of the above the road radiation patterns 18 generated by the antenna when suitably coupled to a source of interrogator radio frequency through coupling means 13 and suitable feed lines 10. Those skilled in the antenna arts will readily understand that although the major radiation lobes of the antenna 2 are shown other minor and insignificant modes such as indicated by 19 may be present.

Referring now to 7-10, there is shown an alternate embodiment of the invention of this application wherein traveling wave long wire antennas 22 are arranged in a V shaped array or configuration and mounted on a single lane unidirectional roadway 24. Each antenna 2 is terminated in a characteristic impedance 26 and is fed by a suitable feed line 28 and coupling means 30.

Figure 8:
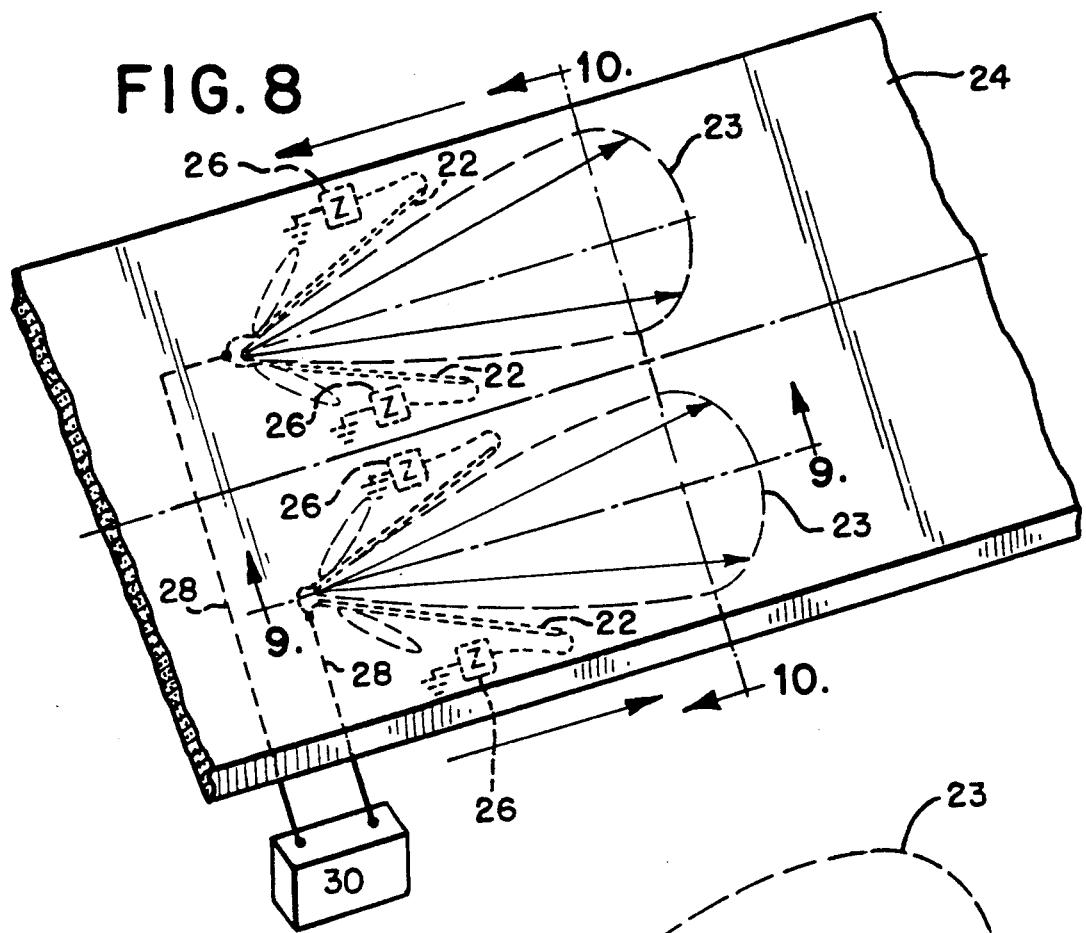
FIG. 8 is a semi perspective representation of two antennas of the type shown in FIG. 7 particularly showing their horizontal plane radiation patterns.
Figure 9:
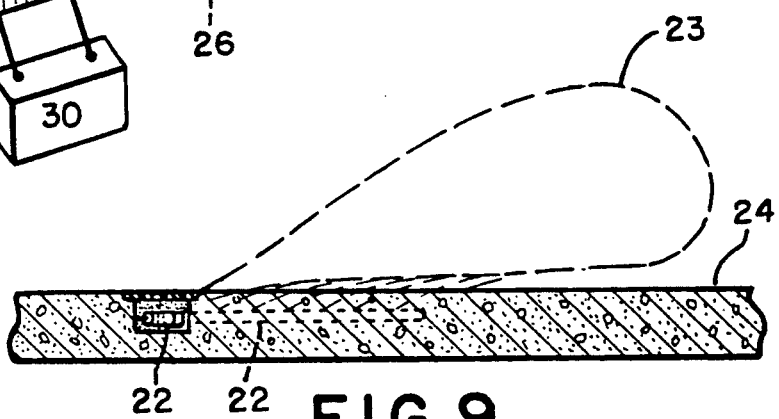
FIG. 9 is a cross sectional view of the above the road radiation pattern of one the antennas of FIG. 8 along the line 9—9.
Figure 10:
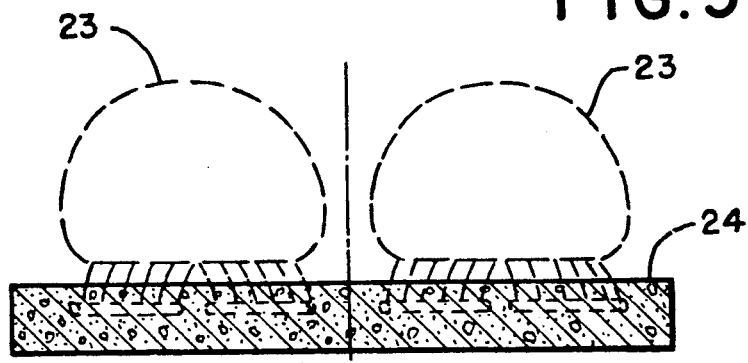
FIG. 10 is a transverse section along the line of 10—10 of FIG. 8 particularly showing the above the road radiation pattern of one of the antennas of FIGS. 7 & 8 when mounted in a bi-directional roadway.

In FIGS. 8, 9, 10, the radiation patterns of the antenna of FIG. 7 are shown. In FIG. 8, the major horizontal radiation lobe contributing to a transponder capture zone is shown as 23. Similarly, in FIG. 9 the above the road dimension of the radiation lobe of antennas 22 is depicted in a plane along the line of 9—9 of FIG. 8.

In FIG. 10 the major radiation lobe 23 of antenna 22 is shown in a transverse plane along the lines 10—10 of FIG. 8.

As a further embodiment of the invention disclosed herein, in FIGS. 11 through 15, there is shown a "meandering" form of microstrip antenna having its longitudinal axis perpendicularly disposed to the direction of traffic along a single lane roadway. As shown the "meandering" antenna 30 is embedded by radio frequency transparent means in the pavement of roadway 34 and fed via suitable lead 36 coupled to an external radio frequency via a coupler 38. Design of including operation and adjustment of the meandering type of stripline antenna is well known to those skilled in the art, and is described in at pages 116-139 in Microstrip Antenna Theory And Design, by J. R. James, P. S. Hall, & C. Wood, published by Peter Perigrinus Ltd, Great Britain, 1981.

In FIG. 12 the disposition of the antenna 30 and its housing 32 is shown in relationship to the roadway 34.

In FIG. 13 the meandering antenna 30 is shown typically as installed in a two lane bi-directional roadway 35. Also shown is a depiction of the radiation pattern 31 of the meandering antenna 30 in the horizontal plane of a single lane installation. Antennas 30 are fed by suitable antenna leads 36 via a coupler 38.

Figure 14:
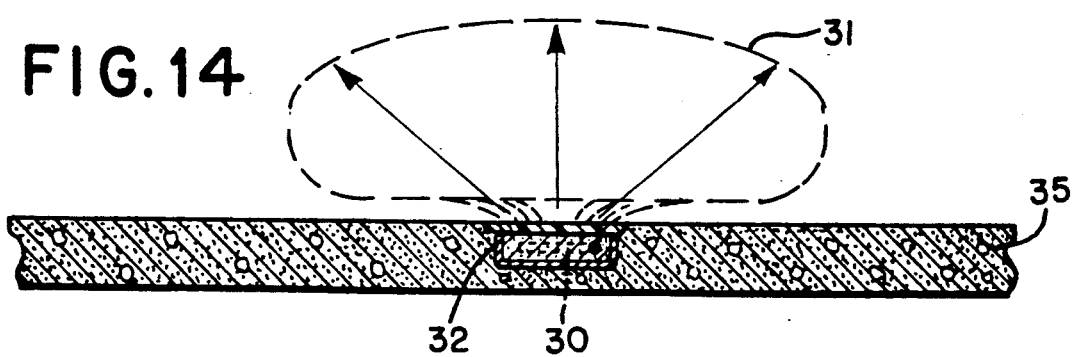
FIG. 14 is a partial section along the lines 14—14 of FIG. 13 showing the radiation pattern of the meandering antenna of FIG. 11 above and along a single lane of the roadway of FIG. 13.
Figure 15:
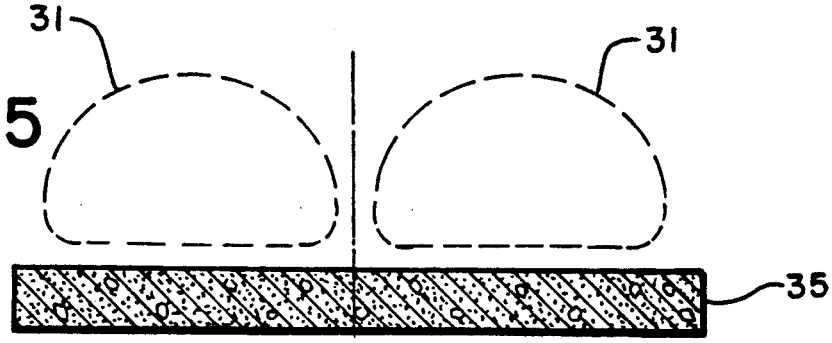
FIG. 15 is an additional section along the lines of 15—15 of FIG. 13 particularly showing above the roadway radiation pattern perpendicular to the roadway across both elements of the antenna of FIG. 13.

FIGS. 14 and 15 are a depiction of the radiation patterns of the bidirectional application of the meandering antenna 30. In particular FIG. 14 shows a depiction of the transverse radiation pattern of antenna 30 in a plane parallel to the direction to the traffic flow along the lines 14—14 of FIG. 13.

Figure 16:
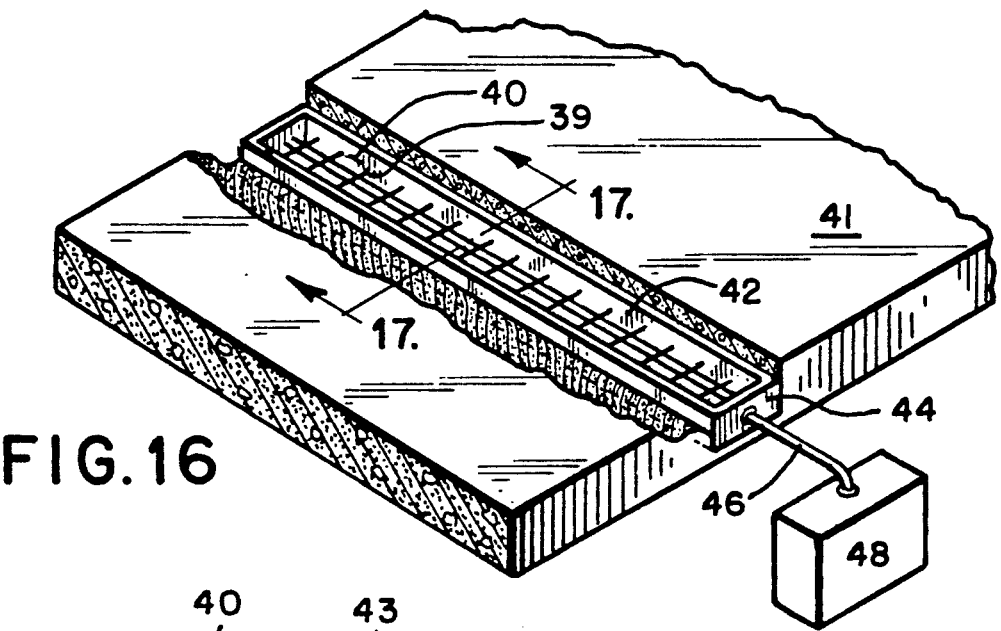
FIG. 16 is a partial, tear-away semi-diagrammatical representation of the road antenna of a multi-element phased dipole array shown disposed perpendicular to a single lane roadway.
Figure 17:
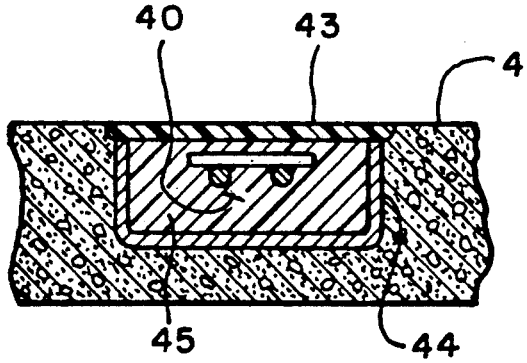
FIG. 17 is a section of the antenna/roadway of FIG. 16 particularly showing the phased dipole mounted in the roadway pavement.

An additional alternate embodiment of the invention disclosed herein, is shown in FIGS. 16 through 20. With particular reference to FIGS. 16 and 17, there is shown a dipole array 40 having a multiplicity of dipole elements 39 electrically connected via a multiplicity of interelement phasing stubs 42. Construction of the array can utilize free standing elements as shown, or in the alternative, utilize microstrip construction, (not shown) as referenced earlier. The array 40 is contained in a housing 44 embedded in a roadway 41. The array 40 is supported internal of the housing 44 through use of suitable mechanical supports or a suitable filler or potting material 45. Any support material used should provide a means of positioning the array within its housing and should be essentially transparent to the electromagnetic radiation as is the cover of 43. The array 40 is electrically fed by a transmission line 46 and driven by source of radio frequency via couple 48. Design of multiple element phased arrays of this type are well know to those skilled in that art, and typically shown in transmission lines, antennas and wave guides, by King, Mimno, & Wing, published by McGraw Hill (chapter II, Section 41).

Figure 18:
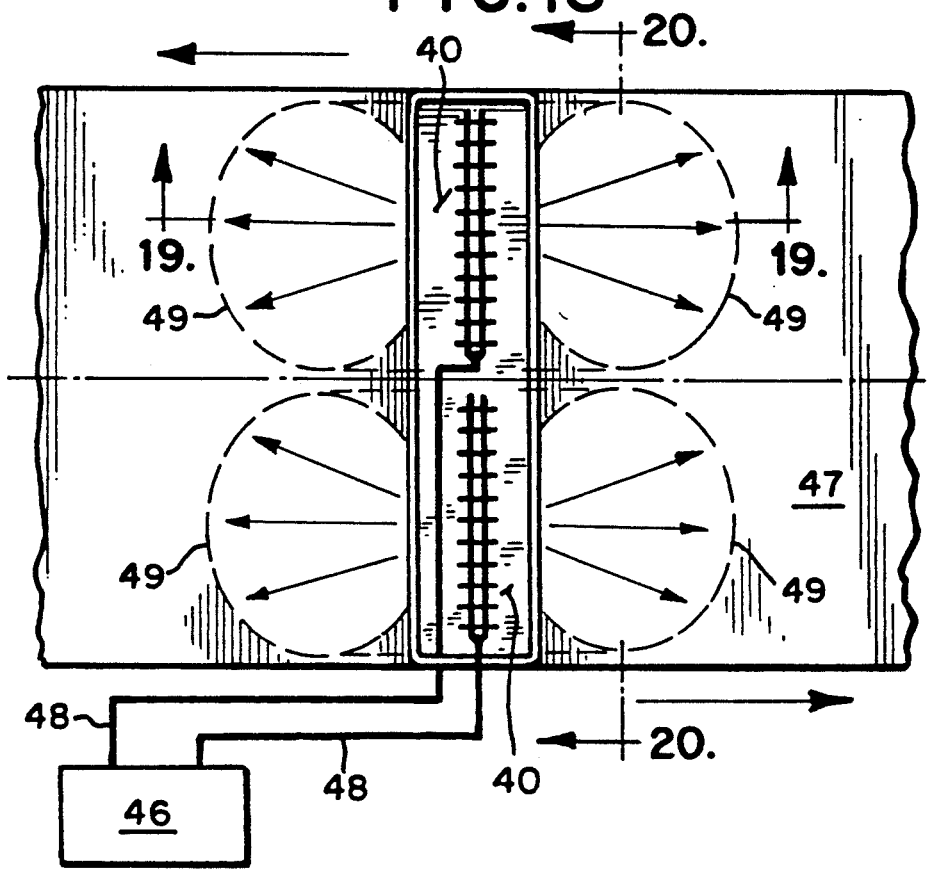
FIG. 18 is a plan view of the antenna of FIG. 16 shown typically mounted in a two lane bi-directional roadway. Horizontal plane radiation patterns are also depicted.
Figure 19:
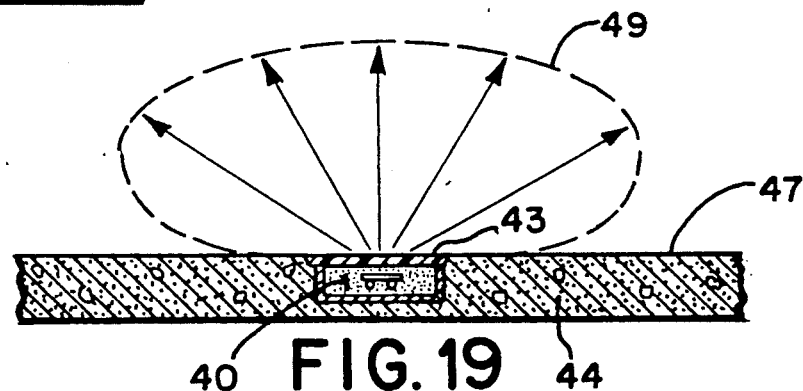
FIG. 19 is a partial cross section along the lines 19—19 in FIG. 18 particularly showing the antenna mounted in a roadway and a depiction of the antenna radiation patterns along 19—19.
Figure 20:
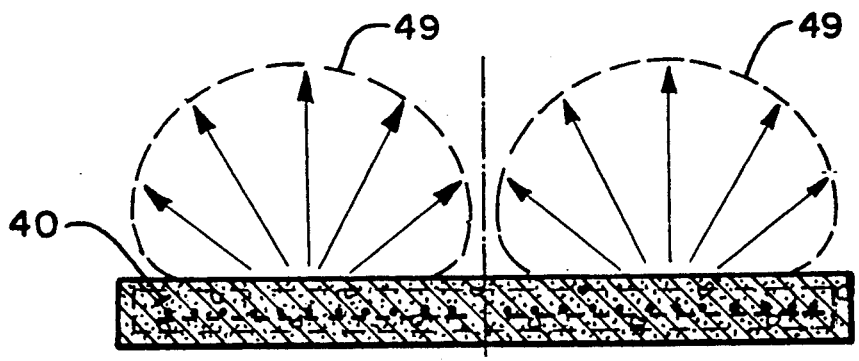
FIG. 20 is an additional cross section of the antenna and roadway of FIG. 18 along the lines 20—20 particularly depicting above the roadway radiation patterns with the antenna of FIG. 16.

Turning now to FIGS. 18, 19 and 20, wherein principal radiation fields or lobes 49 for the array 40 embedded and perpendicularly disposed to traffic flow in a bidirectional two lane roadway 47 is shown. As in the above described single lane application, bidirectional antennas 40 are fed by suitable antenna transmission lines 48 and matched to an interrogator, or external source of radio frequency via a coupler 46.

FIG. 19 depicts the radiation pattern of the array 40 contributing to a vehicular transponder capture zone in a plane parallel to the flow of traffic in each lane of the bidirectional roadway 47 along the line 19—19 prime of FIG. 18.

FIG. 20 is a further depiction of the radiation lobes of the array 40 in a plane perpendicular to the direction of traffic along a bidirectional two lane road along the lines 20—20 of FIG. 18.

FIG. 21 through 24 show a further embodiment of the invention disclosed herein, use of a "slot" antenna array 50 embedded in the surface of a roadway 58. The array 50 comprises an essentially flat conductive surface 51 defining a multiplicity of slots 54, each slot having a length 56 (typically one half wavelength at the operating frequency, a width 59, and a slot material thickness 62. The determination of these antenna constants will be found in a variety of design texts. Included in this group are the antenna handbook by Y. T. Lo & S. W. Lee, published by Van Nostrand, Reinholdt, New York, N.Y. 1988, and the antenna engineering handbook by Henry Jasik (editor) published by McGraw-Hill New York, N.Y. 1961 in particular, sections 8.2 through 8.11. Similar antenna design and application is also provided in the reference data for radio engineers published by Howard W. Sams & Co. New York, N.Y. 1981 particularly at pages 27-14 & 27-15.

A typical but not exclusive method of feeding of the slot elements of the slot array 50 is via matching stub network 53 and transmission line 55. Although the matching array 53 and transmission line 55 is depicted for a representative number of slots, those skilled in the antenna arts will readily realize that similar exitation will be required for each slot. The array 50 is shown mounted on a box-like support 60 embedded in the road 58. Other methods of mounting the array can be used, as may be required for specific applications.

In FIG. 21, there is shown a depiction of the radiation pattern of the slot array contributing to a transponder capture zone 52 in a plane parallel to the surface of the road 58. FIG. 23 shows a depiction of the radiation field pattern 52 in plane perpendicular to travel along roadway 58 along the line 23—23 of FIG. 21. An optional non-conductive cover 64 is shown over the surface 51.

Figure 24:
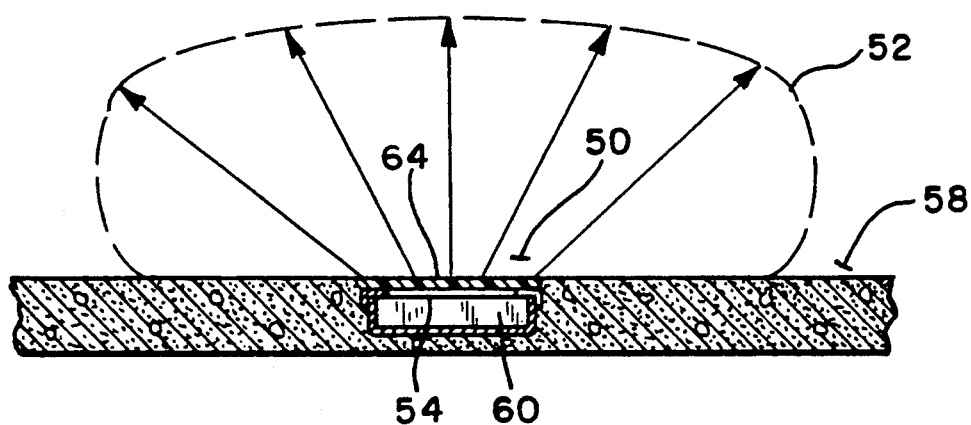
FIG. 24 is a further section along the lines 24—24 of FIG. 21 particularly showing the antenna/roadway structure, depicting the radiation pattern transverse to a single lane roadway/antenna combination.

FIG. 24 is a depiction of the field strength or radiation lobes 52 of the antenna array 50 in a plane parallel to the direction of traffic along the road 58 and along the lines 24—24 of FIG. 21.

With reference to FIGS. 26 and 27, the further and alternate embodiment of the invention disclosed is shown. In particular, FIG. 26 is a perspective semipictorial representation of a bi-directional toll booth 80 equipped for electronic identification of vehicles passing through bi-directional lanes 82 and 84. Lanes 82 and 84 are separated by an appropriate divider 85. In keeping with the invention disclosed herein, uni-directional lanes 82 and 84 are equipped with overhead antenna assemblies 86 having a radiation pattern 97 incorporating a radiation beam angle 96 sufficient to intercept approaching typically shown in FIG. 27.

The overhead antenna assembly 86 utilizes a radiating assembly 92 positioned internal of a mechanical and electrical shield or reflector 90, and is attached to the booth canopy 81 via a mounting bracket 88. A detailed description of the antenna assembly 86 is shown on FIG. 28. The radiating portion of the overhead antenna array 92 is disclosed in this embodiment as the well known collinear array. Although other radiating arrays can also be used such as slotted or leaky coax, (Ref. FIG. 3) of the type disclosed in U.S. Pat. No. 3,691,488, the disclosure of which is incorporated herein by reference.

Antennas of the collinear array are described in great detail in many standard antenna text such as Transmission Lines, Wave Guides and Antennas by authors King, Mimno and Wing published by McGraw Hill book company. In particular the antenna of this embodiment is described in pages 133-145 and 151-156 of the aforementioned reference. Although the collinear array is disclosed in this embodiment, those skilled in the art will readily be able to adapt other antenna configurations such as coaxial dipoles, folded dipoles, or any one of the arrays disclosed in this application for overhead road mounting. If other arrays are utilized, simple variations of the assembly 86 and housing 92 would be suitably designed to contain each individual array.

Turning to FIG. 28, the collinear array 92 comprises an outer case 98, and end supports 99 for suitable attachment to the antenna housing 90. Internal of the outer case 98 is a collinear antenna assembly assisting of a longitudinal array 104 of radiating elements 101 having a electrical half wave length made up of proper lengths cf coaxial cable, typically RG8. As shown each radiating element 101 consists of an outer insulating sheath 107, an outer shield 109 and inner conductor 111. As shown, in order to achieve the proper phase reversal as required for collinear array operation each element is connected as shown serially from inner conductor to outer shield. The end element is terminated in a noninductive resistance 113 typically, the terminating resistance for RG8U is 52 ohms.

It should be noted that the choice of a collinear array provides substantial flexibility in the length of the array in that within reason, any number of elements 104 can be connected in the manner shown for traversing the roadway lane 84 (reference FIG. 26 and 27).

The array 92 is driven or coupled to a source of radio frequency voltage and current, typically the roadside interrogator or the circulator 69 of FIG. 25 through a random length feed coaxial cable 100. In order to match the unbalanced feed line 100 to the coaxial array, a balloon consisting of a ¼ wave lengths of an outer braid 105 suitably attached to an additional ¼ wave section of coaxial cable 102 having its shield 109 terminated, with the external braid 105 connected to the outer shield 109 of the driver input coaxial cable 100, all as shown in FIG. 28.

Figure 31:
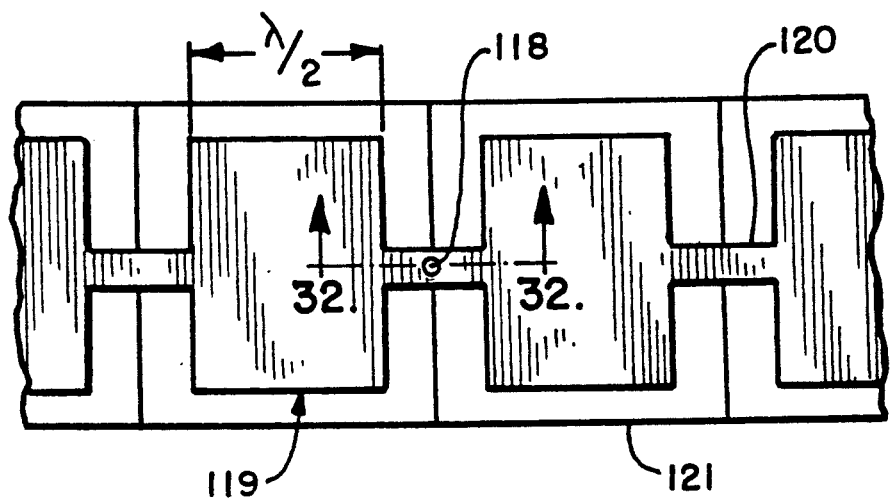
FIG. 31 is a detailed portion of the strip line patch antenna of FIG. 29.

An additional embodiment of the invention disclosed herein is a linear microstrip patch design (Ref. FIGS. 11, 12 & 13). With particular reference to FIGS. 29, 30, 31, there is shown an antenna array 115 comprising a multiplicity of series feed patch radiators 119 interconnected by feeders 120 and extending across the roadway 117 in a grove or slot 116 cut into the roadway. The array 115 is fed via a coaxial cable 123 at essentially its center 118, although other feed points in similar feeder elements 120 would function as well.

Figure 32:
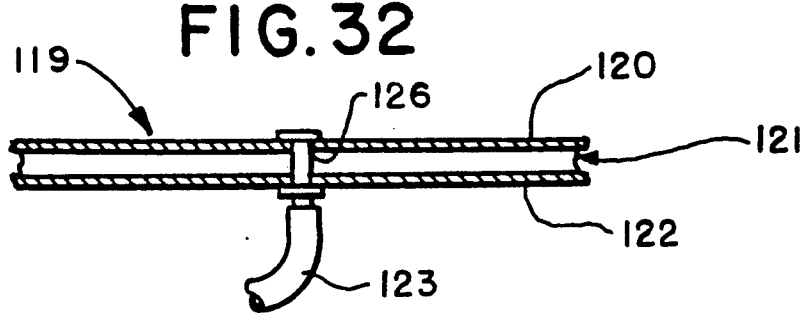
FIG. 32 is a partial section along the line of 32—32 of FIG. 31 particularly showing a method of feeding the strip line/patch antenna of FIG. 29.

In particular reference to FIGS. 31 & 32, the antenna array 115 elements 119 are mounted on a radio frequency transparent substrate 121, with the patch and feeder elements on the upper surface of the substraight, and a conductive sheet or ground plane 122 on the opposite face of the substrate 121. Radio frequency energy or power is introduced by and feeds the antenna array as shown in FIG. 32 via a coaxial cable 123. The outer shield or braid of the coaxial cable 124 is connected to the lower conductive plane 122 at 126. The inner or center conductor of the coaxial 123 is isolated from the conductive plane 122 and passes through the insulating and RF transparent substraight 121 terminating in the inter element connecting feeder 120 at 118. The design and operation of this type antenna is related to the meandering form of microstrip antenna described above. Those skilled in the arts will find details of the construction of a patch type microstrip array in the above reference associated with the microstrip meandering version. In operation, the road radiation pattern of the microstrip patch array is similar to that of the meandering version as shown in FIGS. 13, 14 & 15.

Figure 33:
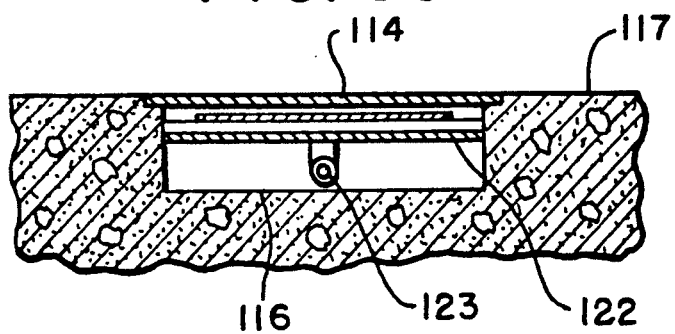
FIG. 33 is an alternate positioning of the patch antenna of FIG. 29 when mounted in the roadway surface.

FIGS. 30 & 33 show alternate positions of the microstip patch antenna array 115, providing some adjustment of the above road radiation pattern with the configuration of FIG. 33 a preferred choice.

In keeping with the invention disclosed herein, FIG. 25 shows a typical but not limiting block diagram showing the inter connection between the antennas disclosed herein and associated portions of the reader or interrogator unit. A complete description of the reader interrogator unit is contained in U.S. Pat. No. 4,870,419, (incorporated by reference above).

With particular reference to FIG. 25 there is shown a trigger and data generator 61 generating trigger and data pulses for transmittal by radio frequency at a predetermined frequency pulse widths, and data rates, by a transmitter 63. The output of of the transmitter 63 is supplied to one input of a circulator 69. The operation of the circulator will be well known to those skilled in the radio frequency arts as a device which essentially isolates the radio frequency receiver 71 from the transmitter 63 when radio frequency output from the transmitter is present.

In operation, with the component connections shown in FIG. 25, initial trigger signals are transmitted through the circulator to any of the road antennas as described herein above and depicted in FIG. 25 as 67. On activation of a vehicle mounted transponder 95 (reference FIG. 27) the transponder retransmits information bearing signals to the road antenna. In the absence of the triggering pulse from the transmitter 63, the circulator 69 allows signals from the transponder 95 appearing at the output of road antenna 67 to enter the radio frequency receiver 71 where it is decoded in the decoder/reader units 73. As mentioned earlier a complete description of reader/transponder operation will be found in the prior incorporated by reference U.S. Pat. No. 4,870,419. Thus it is apparent that the inventors by their disclosure herein have provided in accordance with there invention road antennae that fully satisfies the objects aims and advantages as set forth in the above specification.

While the antennae disclosed has been described in conjunction with a series of specific embodiments thereof, it is evident that many alternatives, modifications and variations will be apparent will be apparent to those skilled in the antenna arts in light of the inventors foregoing description. Accordingly, it is intended to embrace all such alternatives, modifications and variations that may fall within the spirit and broad scope of the appended claims.

Therefore we claim:

1. An antenna array embedded in the surface of a bi-directional multi-lane roadway having predetermined land widths for establishing radio frequency communication between a roadside interrogator and a transponder mounted on the underside of a vehicle moving along one of said roadway lanes comprising:
  a plurality of radiating elements each having an associated electromagnetic field, said elements generally disposed in said roadway pavement and configured to generate an electromagnetic field alternating at a predetermined frequency, said field defining a transponder capture zone along and above said roadway lane and extending across said lane width for communicating with said transponder; and,
  interrogator output means supplying alternating current at said frequency to said radiating elements.

2. The antenna configuration of claim 1 wherein said radiating elements further comprise:
  a plurality of dipoles resonant at said frequency. Each said dipole having an associated electromagnetic field;
  means phasing said dipoles for directing said associated field along said roadway thereby establishing said capture zone.

3. The antenna array of claim 1, wherein said radiating elements comprise:
  at least one linear conductor aligned in a generally skewed position with respect to said roadway longitudinal axis; and,
  a first end on said conductor, said first end in electrical communication was said interrogator output means;
  a second end on said conductor; and means terminating said second end in its characteristic impedance.

4. The antenna array of claim 1, wherein said radiating elements comprise at least two linear conductors having a common end and an included angle therebetween, said conductors angularly displaced from said roadway longitudinal axis, means terminating distal ends of said conductors in a characteristic impedance.

5. The antenna array of claim 1 wherein said radiating elements comprise:
  a plurality of conductors electrically connected end-to-end in an alternating pattern, said alternating pattern having a transverse axis extending across said roadway, conductors having initial and terminal ends; and,
  means electrically coupling said initial end and said interrogator output means.

6. The antenna array of claim 1 wherein said radiating elements comprise a slot antenna extending generally across said roadway surface.

7. Antenna array of claim 1 wherein said radiating elements comprise a plurality of series fed linear microstrip patch elements, each said element having a resonant length of one half wavelength at its operating frequency.

8. In a system for identifying moving vehicles traveling along a roadway through radio frequency communication between a transponder mounted on said vehicle and a roadside interrogator generating signals for transmission from said roadway to said transponder for actuating said transponder and receiving transponder generated signals identifying said vehicle, the improvement comprising;
  a lane in said roadway, said lane having a predetermined width;
  an antenna array, embedded in said roadway for transmitting and receiving said signals further comprising:
  a plurality of radiating elements each having an associated electromagnetic field, said elements generally disposed in said roadway surface and configured to generate an electromagnetic field alternating at a predetermined frequency, said field defining a transponder capture zone along and above said roadway and extending across said roadway width for communicating with said transponder; and, interrogator output means supplying alternating current at said frequency to said radiating elements.

9. In a system for identifying moving vehicles traveling along a bi-directional multi-lane roadway through electromagnetic communication between a transponder mounted on said vehicle and a stationary interrogator generating signals for electromagnetic transmission to said transponder and receiving transponder generated electromagnetic signals, said transponder signals identifying said vehicle, the improvement comprising:

a lane in said roadway having a predetermined width;

an antenna array generally extending over said roadway and above said vehicles, said array further comprising:

means electrically coupling said interrogator and array for transmitting radio frequency signals therebetween;

a plurality of radiating elements each having an associated electromagnetic radiation field;

means mounting said radiating elements over and above said roadway;

means configuring said elements, said configuration generating a radiation field, said field defining a transponder capture zone over and above said roadway and extending across said roadway width;

wherein communication is established between said interrogator and any transponder entering said zone.

10. The array of claim 9, wherein said plurality of radiating elements is a collinear array.

11. The collinear array of claim 10 consisting essentially of linearly aligned coaxial phase reversing and radiating elements constructed from segments of coaxial cable.

12. The array of claim 9 wherein said plurality of radiating elements comprises a group of phased dipoles.

13. The array of claim 9 wherein said radiating elements comprises a microstrip of meandering antenna.

14. The array of claim 9 wherein said radiating elements comprise a slot antenna.

15. The array of claim 9 wherein said radiating elements comprise a plurality of linear microstrip patch elements, each said element having a resonant length of one half wavelength at its operating frequency.

16. In a system for identifying a moving vehicle traveling along a roadway through radio frequency communication between a transponder having an antenna, said transponder and antenna mounted on said vehicle for generating and absorbing signals by far zone electromagnetic radiation, and a roadside interrogator generating signals for transmission from said roadway to said transponder wherein interrogator actuation of said transponder and reception of said transponder generated signals by said interrogator identifies and communicates with said vehicle, the improvement comprising:

an antenna array embedded in said roadway for transmitting interrogator signals and receiving transponder signals, further comprising:

a plurality of radiating elements, each having an associated electromagnetic field, said elements generally disposed across said roadway surface and configured to generate a composite far field radiation pattern alternating at a predetermined frequency, said pattern defining a transponder capture zone along and above said roadway for far zone communication with said transponder; and interrogator output means supplying alternating current at said frequency to said radiating elements.

17. In combination, a transponder mounted on a vehicle moving along a roadway, and an antenna array embedded in the roadway surface for establishing radio frequency communication between the transponder and a roadside interrogator comprising:

a roadway having a surface and predetermined width for carrying vehicular traffic therealong;

a vehicle traveling on said roadway along a trajectory, said trajectory randomly positioning said vehicle within said roadway width; and, a roadway antenna, for generating and absorbing electromagnetic radiation when positioned in an electromagnetic field, said field having a far zone, said antenna having a plurality of radiating elements each having an associated far zone electromagnetic field, said elements generally disposed in said roadway surface and configured to generate a composite electromagnetic field having a far zone alternating at a predetermined frequency, said composite far zone field defining a transponder capture zone along and above said roadway and extending across and beyond said road width for transmitting and receiving signals from said transponder antenna; and, interrogator output means supplying alternating current to said roadway antenna array at a predetermined frequency; and, a transponder having an antenna for generating and absorbing electromagnetic radiation when positioned in an electromagnetic field, said field having a far zone; and, means mounting said transponder on said vehicle, said mounting positioning said transponder antenna within said capture zone when said vehicle passes over said embedded antenna, said mounting spacing said transponder antenna and road surface, said spacing greater than one wave length of said interrogator output frequency;

wherein on said vehicle entering said capture zone, said transponder antenna and embedded antenna occupy the other's far zone, thereby establishing communication with vehicles traveling on said roadway along said trajectory by signals passing through said far zone.

* * * * *